Sept. 9, 1924.  
C. W. HORSTMANN ET AL  
1,508,328  
BRAKE EQUALIZER  
Filed Feb. 7, 1923  
2 Sheets-Sheet 1
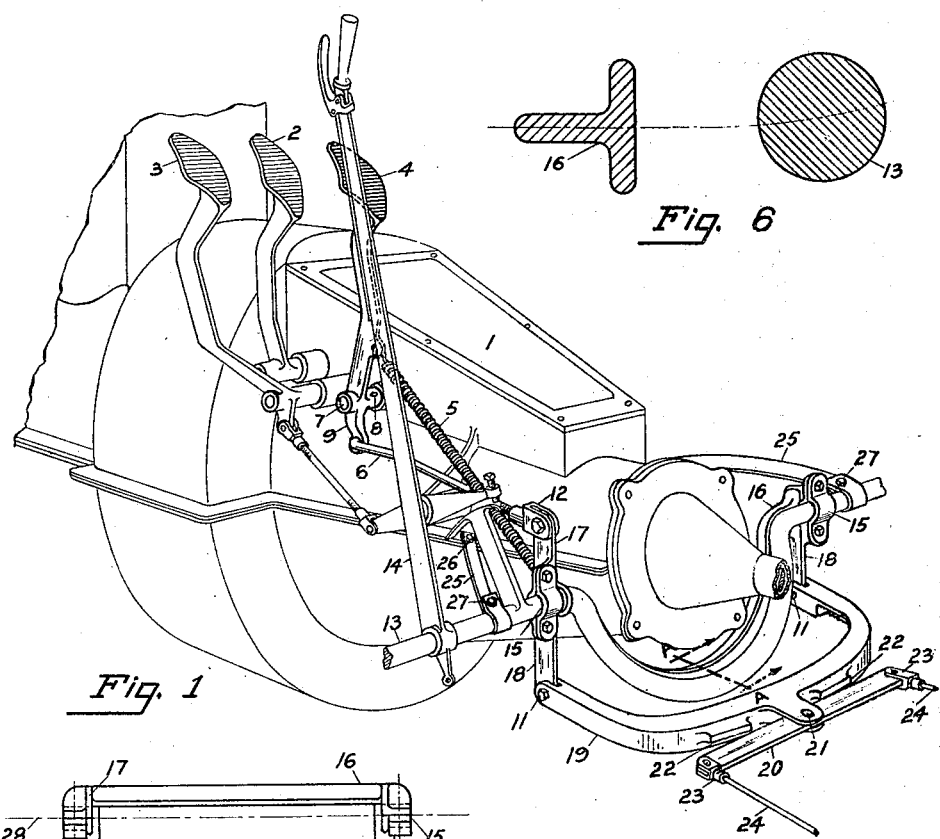
Fig. 6
Fig. 1
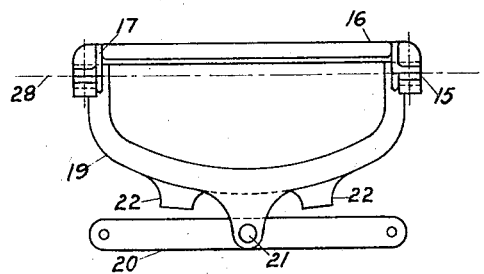
Fig. 3
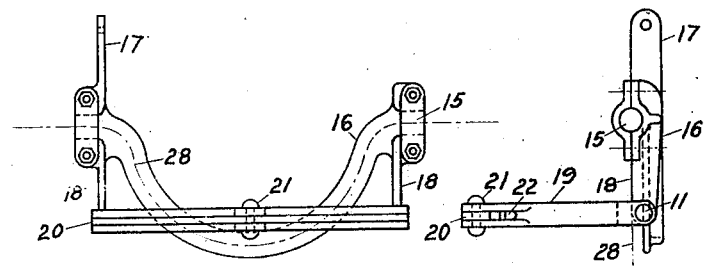
Fig. 4
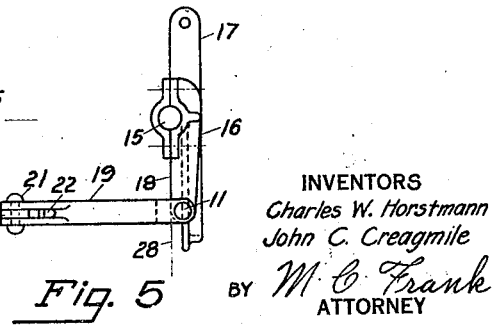
Fig. 5
INVENTORS  
Charles W. Horstmann  
John C. Creagmile  
BY M. C. Frank  
ATTORNEY Sept. 9, 1924.                    1,508,328
C. W. HORSTMANN ET AL
BRAKE EQUALIZER
Filed Feb. 7, 1923         2 Sheets-Sheet 2

INVENTORS
Charles W. Horstmann
John C. Creagmile
BY M. C. Frank
ATTORNEY

Patented Sept. 9, 1924.

1,508,328

UNITED STATES PATENT OFFICE.

CHARLES W. HORSTMANN, OF OAKLAND, AND JOHN C. CREAGMILE, OF BERKELEY, CALIFORNIA.

BRAKE EQUALIZER.

Application filed February 7, 1923. Serial No. 617,466.

*To all whom it may concern:*

Be it known that we, CHARLES W. HORSTMANN and JOHN C. CREAGMILE, citizens of the United States, residing, the former at Oakland, and the latter at Berkeley, both in the county of Alameda and State of California, have invented certain new and useful Improvements in Brake Equalizers, of which the following is a specification.

Our invention relates in general to automobile brake mechanisms, and in particular to a brake equalizer for automobiles of the Ford type.

The chief object of the invention, is the production as a separate article of manufacture, of a brake equalizer of simple construction, and adapted primarily for installation to existing cars.

To this end we have contrived automatically operating mechanism, which, in response to foot-pedal or hand-lever actuation, will equalize the pressure applied to the brake drums associated with the rear wheels. This not only increases the efficiency in braking, but extends the life of the entire structure by the elimination of jar and uneven stresses, thereby easing the riding qualities of the superstructure of the car to a high degree whenever the brakes are applied.

A further object is to provide operating mechanism common to both the foot pedal and the hand lever, that will render the brakes independently operable by either of said levers, and the arrangement being such that the operation of the brakes by means of the foot lever will not change the normal position or relation of the emergency hand lever.

In addition to the above broader features of the invention, there are certain details of design, whereby compactness, durability of structure, and positiveness and ease of operation are attained, and which are shown on the accompanying two sheets of drawings, and which show in this instance, our invention applied to the transmission assembly of a Ford automobile, and the description of which will be confined thereto as an illustrative example.

Adverting to the drawings:

Figure 1 is a perspective view of the control mechanism of a car at rest, our invention being shown in heavy lines.

Figure 3 is a plan of the U-frame and draft appliance of the invention. Figure 4 is a side elevation of the same and Figure 5 an end elevation thereof.

Figures 7, 8:
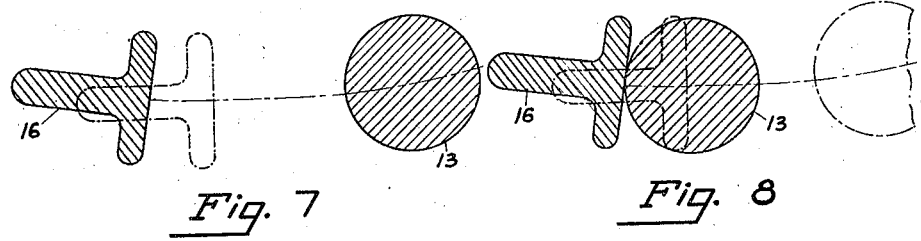

Figure 6 is a sectional view taken on the line A—A of Fig. 1, and shows on an enlarged scale the relative positions of the U-frame and controller shaft at rest. Figure 7 is a similar section but on line B of Fig. 2, and shows the relative positions when the foot pedal is depressed. Figure 8 is a similar section of Fig. 2, and shows the relative positions in action, that is, the brake pedal depressed and the hand lever set. The dot-and-dash lines of the two latter figures show the normal or rest positions of the U-frame and controller shaft respectively.

In the figures, the numeral 1 represents the transmission assembly in its entirety of a Ford automobile and to which the customary reverse pedal 2 and clutch pedal 3 are shown in their related positions. The brake pedal 4, shown in heavy lines, is part of our improvement together with spring 5 and link 6.

7 is the existing brake-pedal shaft of the transmission and to which the brake pedal is secured by pin 8. 9 is a short extension to the brake pedal and to which the link is pivoted. The opposite end of the link is threaded and adjustably secured to the knuckle piece 12.

13 is the common controller shaft of the engine and 14 the existing emergency or hand-brake lever fixed thereto. Supported on the shaft in bearings 15 is another part of our invention, a U-frame 16, the U thereof registering with the U-bend of the controller shaft. To the extremities of the U of the frame and at the bearings are arms 17 and 18 opposed in direction. To the upper arm 17 is pivotally connected the knuckle piece 12, and to the lower arms 18 are pivotally connected as at 11 our draft appliance, which consists of the yoke 19 and equalizer bar 20 pivoted at 21, the midposition of both yoke and bar. On the yoke and on each side of the bar-pivot are stop-bosses 22 with sloping faces for a purpose to be presently set forth.

The equalizer bar 20 has connected at each extremity thereof a knuckle-member 23, to which are secured the brake rods 24.

The coil-spring 5 is hooked in tension to the brake-pedal 4 and controller shaft 13 as shown, to draw and hold the brake pedal in its normal rest position after pressure on the pedal has been released.

The controlled shaft in service with our improvement has a tendency to spring, and we have overcome this by means of the two rigid braces 25, bolted to the housing of the assembly at one end as at 26 and the other end loosely embraces the shaft by the bolt 27. The braces being positioned on the shaft near the U-frame bearings 15.

Figs. 3, 4 and 5 show the U-frame and draft appliance of our invention disconnected from the assembly, and the parts in their normal positions. The light dot-and-dash line 28 in these figures, represents the axis of the controller shaft 13 in relation to these parts.

Fig. 6 shows the position of the U-frame 16 and controller shaft 13 with respect to each other when the brake pedal 4 is at rest and also the hand lever 14, that is, the latter is moved forward as far as it will go and is not in service.

Fig. 7 shows the relation of these members when the hand lever is not in service, but when the brake pedal has been depressed by the foot, the U-frame moving from the normal dot-and-dash line position to that shown in full lines.

Figure 2:
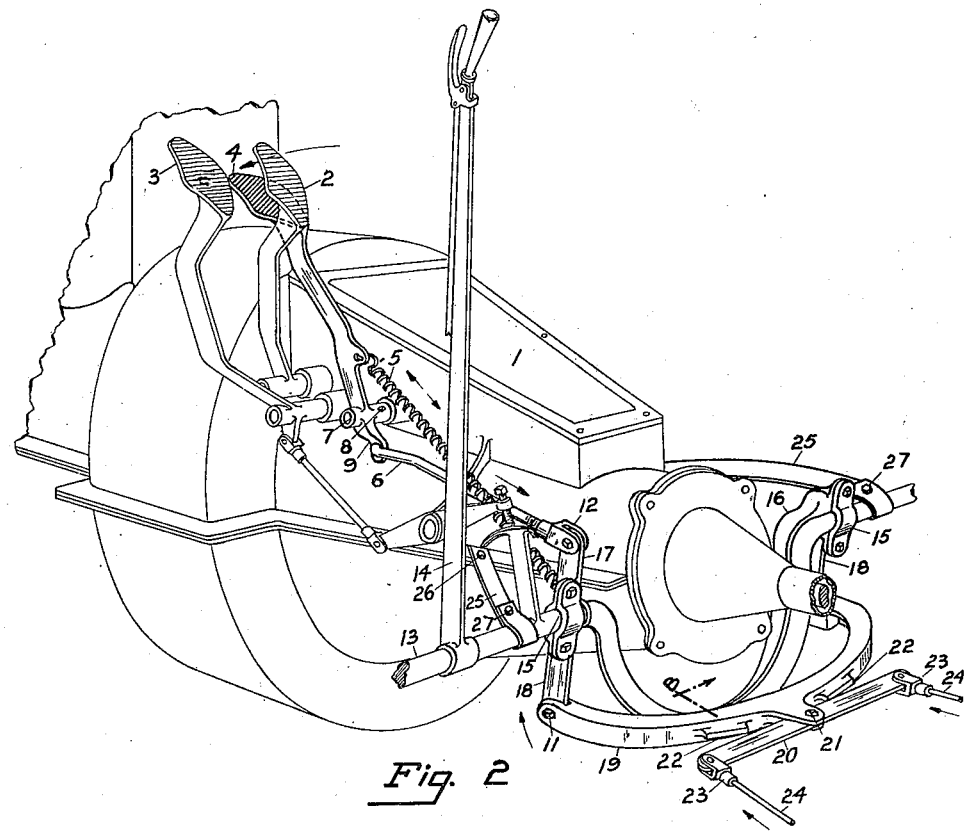
Figure 2 is a perspective view of the same, with the foot pedal depressed and the hand lever set.

Fig. 8 shows the relation of these members when the emergency or hand lever alone has been brought into service, that is, the lever has been pulled back as far as it will go. Fig. 2 shows the lever in this position and also shows the brake pedal lowered as a consequence of the hand lever actuation. The operation of the hand lever has caused the controller shaft to move from the dot-and-dash position shown in the figure, to the full-line position contacting the U-frame, and causing the latter to move from its dot-and-dash position, to the said full-line position, hence the depression of the brake pedal shown in Fig. 2.

In operation, the operator of the car desiring to slow up or stop, depresses the brake pedal 4, which turns about the axis of the brake pedal shaft 7 and causes, through link 6 and arm 17, to oscillate the U-frame about the controller shaft, causing the yoke 19 of the equalizer appliance to move forward, thus drawing the equalizer bar with it, which latter pivoted at its center tenses equally on the brake rods 24, thus effecting equal pressure on the brake drums of the rear wheels. The arrows of Fig. 2 show the direction of the movements of the respective parts, on the depression of the brake pedal 4. On the release of pressure on the pedal, these parts will again come to rest by the reaction of coil-spring 5.

When it is desired that the car shall stand still and in a locked condition, or in case of emergency, a pull backwards on the hand lever 14 will accomplish this. This lever being fixed on the controller shaft, causes the latter to move from its normal at-rest position of Fig. 6, to that shown in Fig. 8, causing the U-frame to function exactly as it did before to operate the equalizing appliance.

The brake pedal of our device does not operate on the brake drum of the transmission, therefore, the engine can be started when the pedal is depressed full, caused by the hand lever being set, as clearly shown in Fig. 2.

In the application of the brakes, should one of the brake rods 24 break, the unbroken rod would function and stop the car, as the stop-bosses 22 are set immediately behind the equalizer bar 20 to limit the backward movement thereof for this emergency, the slope on the stop-surfaces being sufficient to allow the full bearing thereon.

Having illustrated and described our invention in its preferred form and for a Ford automobile, we wish it to be understood that the same may be modified as practice suggests to suit other cars of this type. Therefore, the patent protection that we desire is all of that which comes within the spirit and scope of the invention as claimed.

We claim:

1. As an element of a brake equalizer, a yoke provided with a pivotal support for an equalizing bar and a boss on each side of said support for limiting the backward movement of said bar.

2. As an element of a brake equalizer, a U-frame having bearings at the extremities of the U, and also having thereat opposed arms in the plane of the U, the said arms forming a pivoted link in the equalizer.

3. In combination with the controller shaft of an automobile, a U-frame pivotally supported thereon and normally held in a vertical plane and a draft appliance pivotally supported to said frame and normally at right-angles thereto, the said shaft adapted to move the said frame radially forward to impart movement to the said appliance for equalizing a pull.

4. In combination with the controller shaft of an automobile, a U-frame pivotally supported thereon and provided with opposed arms, a yoke pivotally connected to the lower arms of said frame, equalizing means pivotally connected to said yoke, a foot pedal, and a link pivotally connecting the foot pedal with the upper arm of said frame, and the said pedal adapted to oscillate the U-frame on said shaft and draw the said equalizing means forward with equal pressure.

5. In an automobile brake mechanism, the combination of a foot pedal, a hand-lever controller shaft formed with a U-bend, and interconnected means pivotally supported adjacent each side of the bend on said shaft, the said means adapted to be operated by either the said pedal or lever for applying the brakes, or both the pedal and lever may be applied simultaneously.

6. In the braking mechanism of a Ford automobile, in combination, a controller shaft formed with a U-bend therein and provided with a fixed hand lever, a U-frame pivotally supported on the shaft and the U of the frame adapted to register with the U of the shaft, braking means secured to said frame, a pair of braces embracing said shaft one on each side of the frame and the opposite ends of the braces rigidly connected to a support, the said braces preventing the controller shaft from springing when the hand lever is applied for causing the U-portion of the shaft to contact and engage the U-frame in the operation of the said braking means.

In testimony whereof we affix our signatures.

CHARLES W. HORSTMANN.
JOHN C. CREAGMILE.